INVENTORS
KENNETH D. FOULGER
ARTHUR G. SILVER
BY Ronald J. Clark
ATTORNEY

Sept. 26, 1967 K. D. FOULGER ETAL 3,344,402

MULTIPLE SECTION SEARCH OPERATION

Filed June 26, 1964 5 Sheets-Sheet 3

United States Patent Office 3,344,402

Patented Sept. 26, 1967

3,344,402

MULTIPLE SECTION SEARCH OPERATION

Kenneth D. Foulger, San Jose, Calif., and Arthur G. Silver, Endicott, N.Y., assignors to International Business Machines Corporation, New York, N.Y., a corporation of New York Filed June 26, 1964, Ser. No. 378,281
9 Claims. (Cl. 340—172.5)

ABSTRACT OF THE DISCLOSURE

The present disclosure is directed towards a record handling apparatus wherein each record is several fixed length sections in length. The first characters in the stored record hold numeric section characters identifying the number of sections in the record. Apparatus is described for locating a desired section at which the transfer is to begin, by comparing a search mask with a data field read from storage, for manipulating the address and section characters required to retrieve a record and for controlling the inter-operation of these and other circuits.

Figure 1:
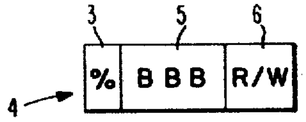

This invention relates to data search and transfer circuits and more particularly, to a multiple section search device operable for automatically searching a plurality of recorded messages for a unique portion thereof and for storing the address of the located message.

Generally, a data processing system includes a Random Access File (RAF) as a permanent filing device for storing the great quantity of reference material required by the processor in performing its function. A typical storage device comprises a plurality of magnetic disks, magnetic drums or closed loop magnetic strips and their accessing mechanism. The recording surface of a magnetic disk contains a plurality of concentric tracks physically separate from each other. Moreover, each track is normally subdivided into a plurality of fixed length sections and each section is used to store a separate message. Normally, in order to retrieve the message from a file section or insert a message into a file section, an address compare operation is performed to locate the correct file section. That is, the address of the desired section is held in the core memory of the data processor and is compared with the section addresses written in the RAF. Therefore, when searching an extensive random access file for an identifying portion of a message and the message address is unknown, it is usually necessary to insert all the addresses of the sequentially stored messages into core memory by programming techniques and then to search each addressed message individually to locate the identification number or word.

Accordingly, it is an object of the instant invention to provide a multiple section search device which progressively searches a plurality of message sections in a storage file.

It is an additional object of the instant invention to provide a multiple section search device which searches a plurality of separately addressable message sections stored in a file under the control of a single programmed operation code.

It is a further object of the instant invention to provide a multiple section search system which stores in core memory the address of the message section holding the identification word.

It is another object of the instant invention to provide a multiple section search system which furnishes control signals to its associated processor for controlling the automatic utilization of the message address located during the search process.

According to these objects, the instant invention contemplates the utilization of an addressing and interrogation circuit of its associated data processor to retrieve an operation code from core memory, which code initiates the multiple section search operation. Additionally, the invention utilizes the core memory of the processor to hold a Disk Control Field (DCF) containing the identification word or number being sought. Address compare circuitry is employed to locate the first message section to be searched, and add circuitry is utilized to control the number of message sections to be searched. A data compare circuit of the associated processor is employed to match the identification number or word with a portion of the message retrieved from the file. A plurality of decode circuits are responsive to the output signals of the processor's data compare circuit and are utilized in determining the status of the identification number or word with respect to the portion of the message retrieved from the file. Finally, a plurality of latches are employed to retain the status of the data comparing operation.

Figure 2:
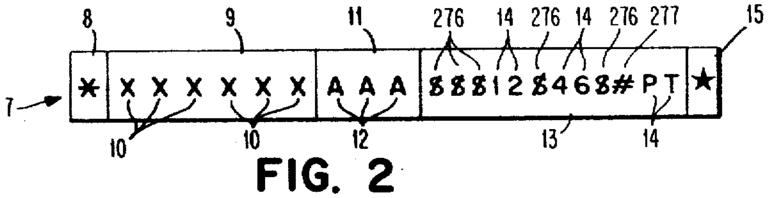
Figure 4:
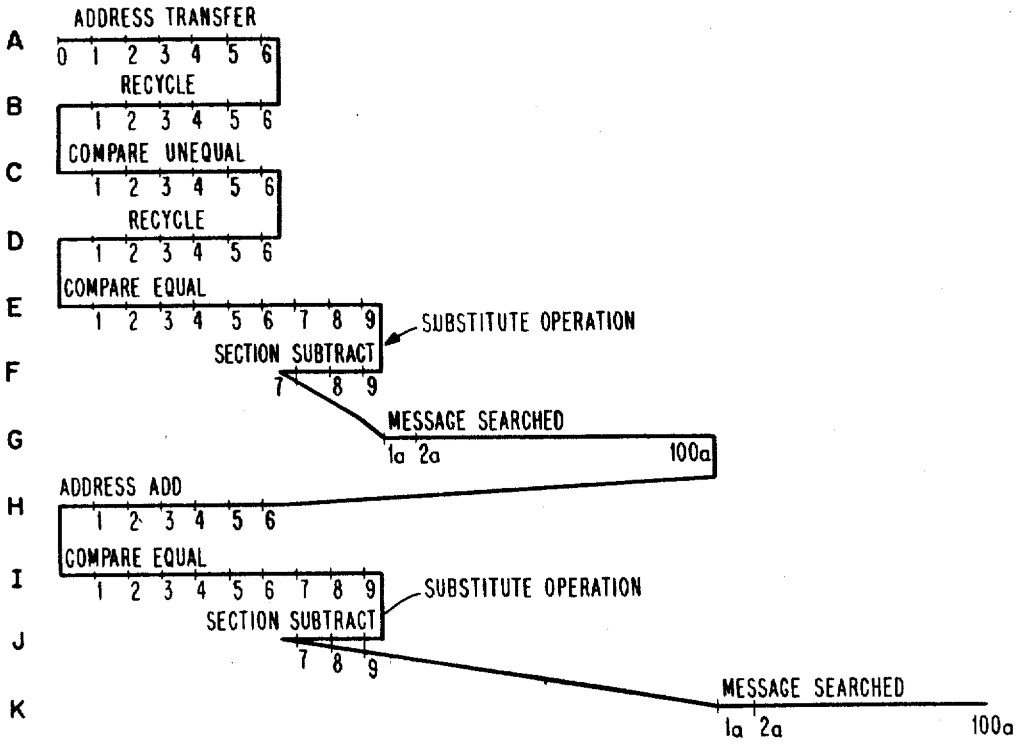
Figure 3A:
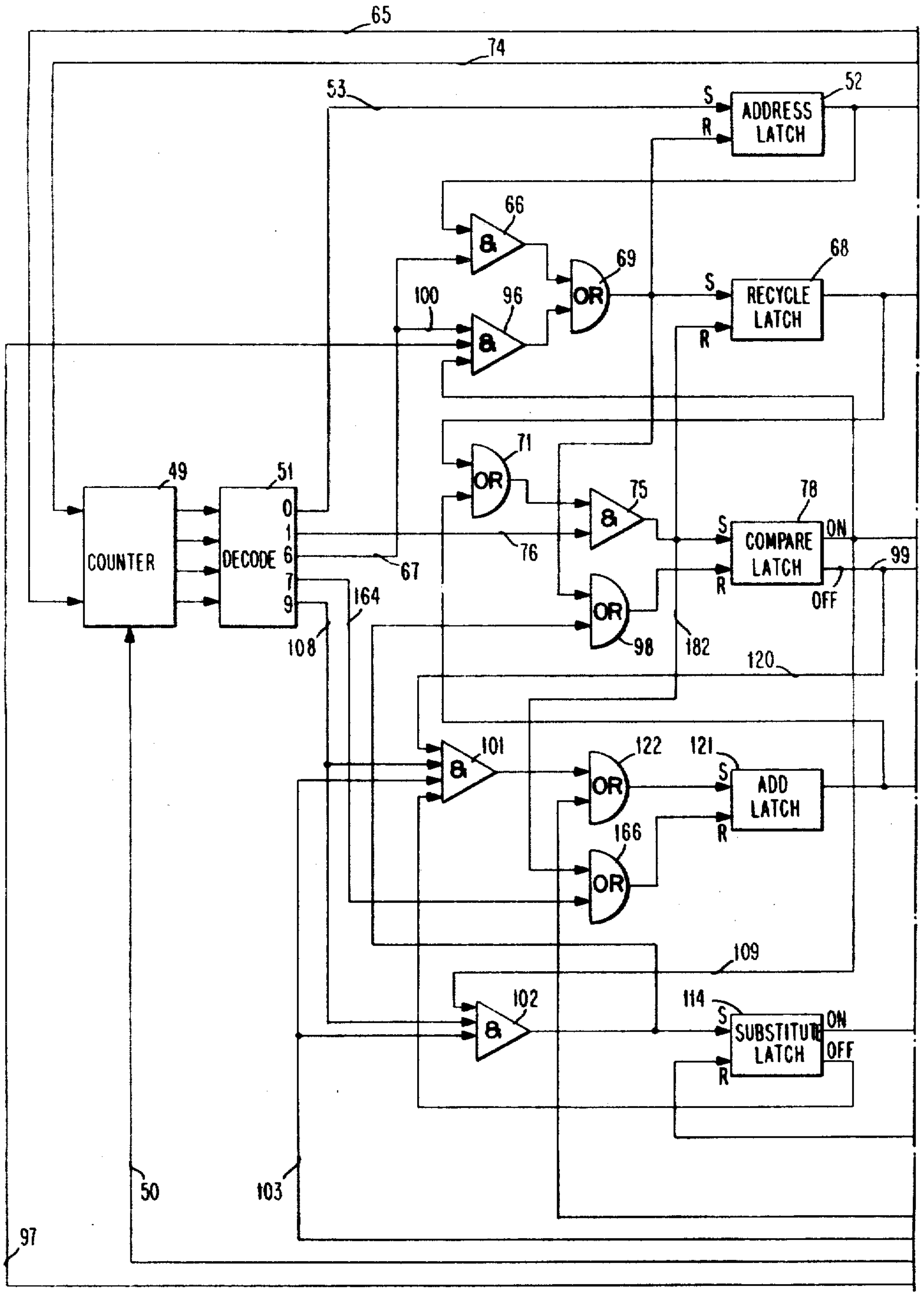
Figure 3B:
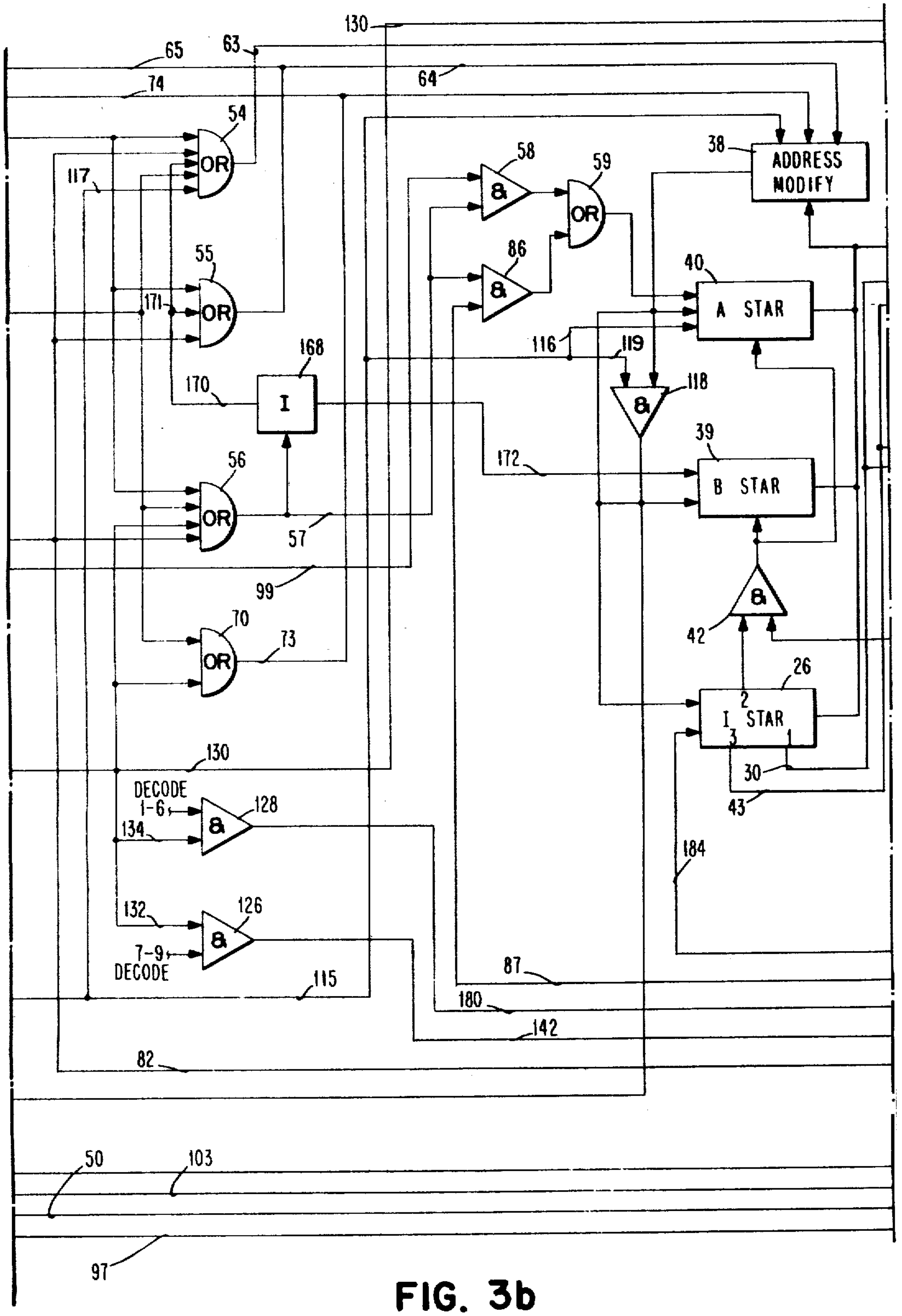
Figure 3C:
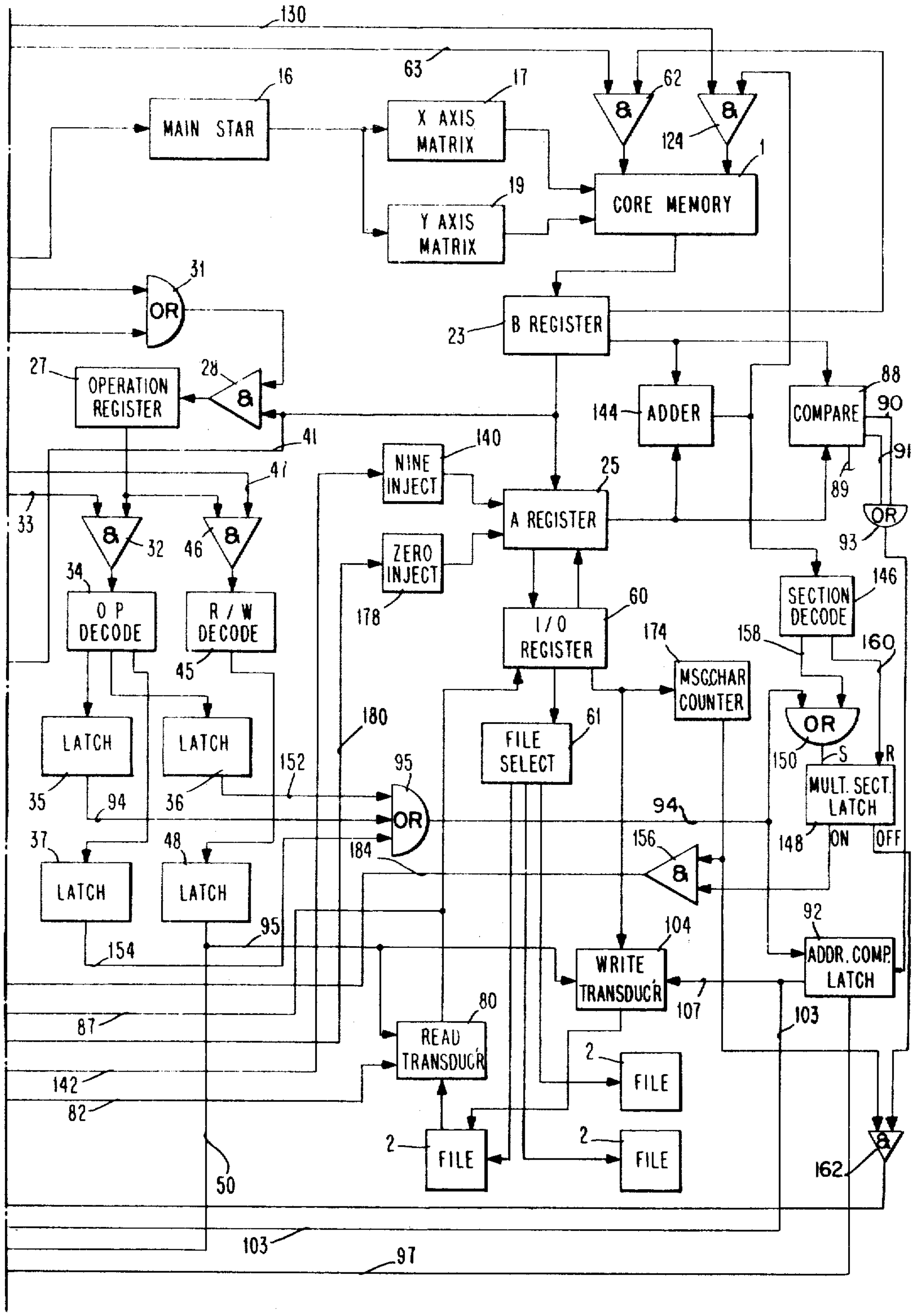
Figure 5:
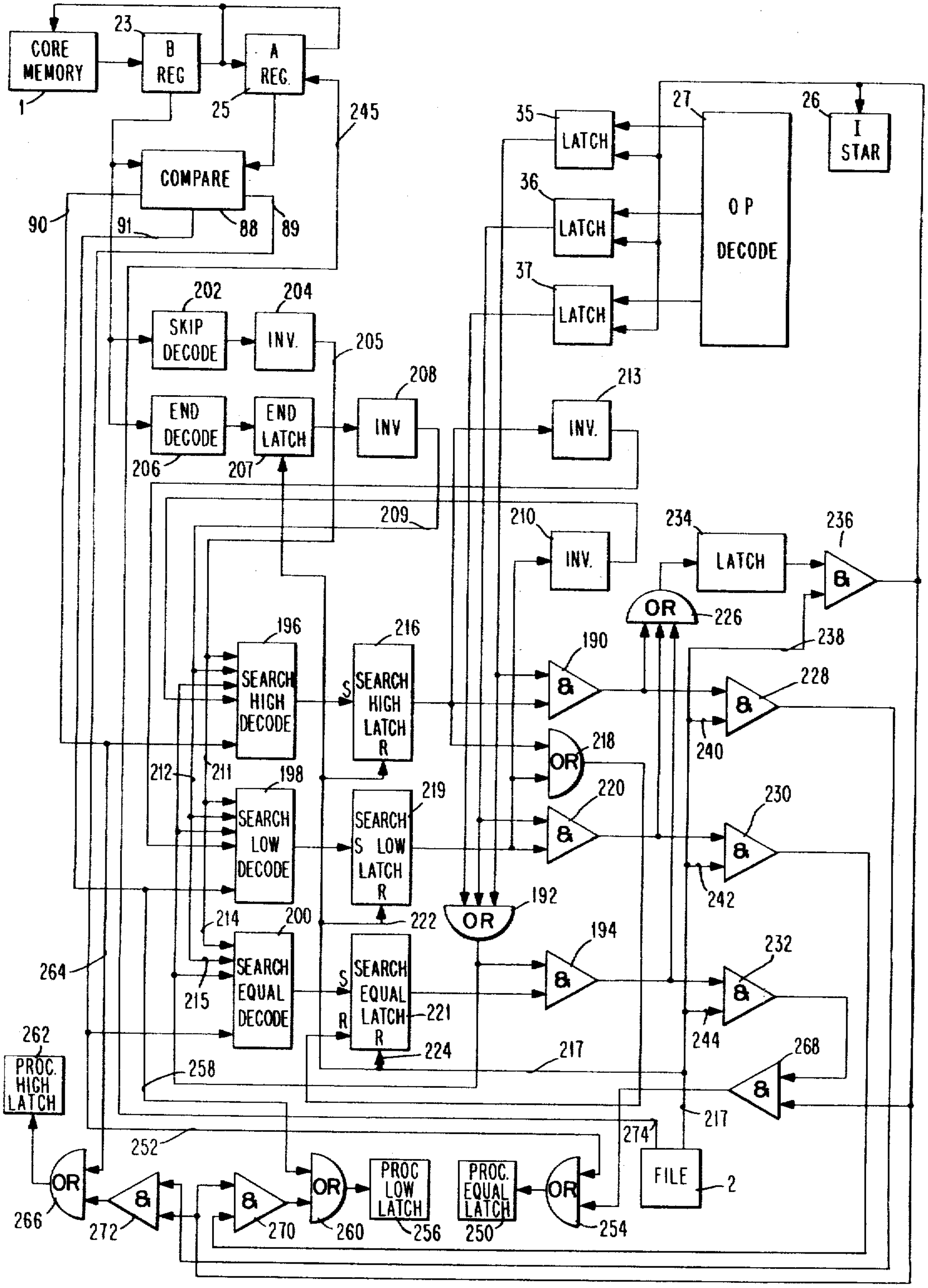

The foregoing and other objects, features and advantages of the invention will be apparent from the following more particular description of a preferred embodiment of the invention, as illustrated in the accompanying drawings, wherein FIG. 1 is a schematic representation of an operation code employed by the associated processor in a multiple section search operation;

FIG. 2 is a schematic representation of the Disk Control Field format employed in the instant invention;

FIGS. 3*a*, 3*b* and 3*c* comprise a block diagram of the address compare and message retrieval circuits employed in the instant invention;

FIG. 4 is a schematic representation of the entire operation of the multiple section search operation; and FIG. 5 is a block diagram of the circuitry employed in determining the status of the retrieved message.

FIG. 3*c* shows a computer core memory 1 and a plurality of RAF modules 2 employed in the instant invention. The interrogation of the memory 1 is completely described by F. O. Underwood in his U.S. Patent 3,077,580, entitled Data Processing System. For a better understanding of this memory interrogation circuitry as employed in the instant invention, the operation of these circuits are again shown and described. However, the detailed operation of these circuits is not repeated. Additionally, standard circuits are identified by name and are not described in detail since they are well known to those skilled in the art.

Referring to FIG. 1, a first portion 3 of an operation code 4 is reserved for indicia which indicates that the computer core memory 1 is to be engaged in a multiple section search operation with one of the files 2. A second portion 5 of this operation code contains additional indicia designating the address location in the core memory 1 of the first character in the Disk Control Field (DCF), described hereinafter, of the message being sought. The third portion 6 of the operation code 4 contains indicia indicating that a read or write operation is to be performed.

FIG. 2 shows a typical DCF format 7 held in the core memory 1. A first area 8 of the DCF format comprises a character indicating a normal module selection process or an alternate method of selecting a substituted module. If the alternate method of module selection is indicated, the character in the area 8 determines which module is selected. A second area 9 of the DCF format holds a plurality of address characters 10 which designate the section address of a RAF section into which or from which the message is to be transferred. A third area 11 of the DCF format normally holds a plurality of section characters 12 which indicate the number of sections to be transferred. A final area 13 of the DCF format 7 contains a plurality of data characters 14 including a message ending indicia 15.

FIGS. 1 and 2 show schematic representations of the indicia and characters employed in the operation code 4 and DCF format 7, respectively. Obviously, these indicia and characters are actually stored in magnetic cores as a pattern of coded magnetic signals.

Referring again to FIG. 3*c*, the core memory 1 contains all the information for controlling the internal operation of the processor and the data transfer operation between the processor and one of the files 2. Each character in the DCF format 7 is set up in a separate storage location in core memory 1 by standard programming techniques which need not be described. In the present description, successive storage locations are employed to hold the characters in a DCF format 7 and to simplify the understanding of the memory interrogation operation. Each storage location in core memory 1 is interrogated by a main Storage Address Register (STAR) 16 and an address select matrix circuit comprising an X axis matrix 17 and a Y axis matrix 19. Upon the interrogation of a particular core memory storage location, the character stored therein is read out into a B register 23 and/or an A register 25.

The core storage address of the first indicia of the operation code 4, shown in FIG. 1, is set into an I STAR 26 by standard computer advancement techniques. That is, as soon as one computer operation is completed, the computer advances to the next programed operation. The indicia in the first portion 3 of the operation code 4 is interrogated under control of the I STAR 26 and the main STAR 16, and it is transferred to an operation register 27 by the B register 23 and an AND gate 28. The I STAR 26 also generates a plurality of enabling output signals which correspond to the various portions of the operation code 4. The first enabling output signal from the I STAR 26 is applied to the AND gate 28 by a line 30 and an OR gate 31 and it is also applied to an AND gate 32 by the line 30 and a line 33. The operation register 27 is connected to an operation decode circuit 34 by the AND gate 32. The indicia in portion 3 of the operation code 4 indicates the type of operation performed between the file 2 and the core memory 1. The operation decode circuit 34 comprises a plurality of matrices for decoding the indicia in portion 3 and it applies an output signal corresponding to each different indicia to a plurality of latches 35, 36 and 37, the functioning of each is described hereinafter.

An address modify circuit 38 receives an input signal from the I STAR 26, a B STAR 39, and an A STAR 40 after their interrogation of each storage location. Prior to the interrogation of the next storage location, the address modify circuit 38 applies its output signal to the I STAR 26 advancing the address held in the I STAR 26 to the next adjacent memory storage location. The B STAR 39 and the A STAR 40 receive advancing signals from the address modify circuit 38 when either of these registers is directing the interrogation of the core memory 1.

During the continued interrogation of the core memory 1 by the I STAR 26, the second portion 5 of the operation code 4 is transferred to the A STAR 40 and the B STAR 39 by the B register 23, a line 41 and an AND gate 42. The AND gate 42 has a second input signal which is the second enabling output signal from the I STAR 26. The A STAR 40 and the B STAR 39 now contain the address location in the core memory of the first character of the DCF format 7. The I STAR 26 continues its interrogation of the core memory 1 and transfers the third portion 6 of the operation code 4 to the operation register 27 by the AND gate 28. The AND gate 28 receives an enabling input signal from the I STAR 26 by a line 43 and the OR gate 31. The output from the register 27 is applied to a read/write decode circuit 45 by an AND gate 46. The AND gate 46 has a second input signal from the I STAR 26 which signal is applied to the AND gate 46 by the line 43 and a line 47. The output of the decode circuit 45 is stored in a latch 48 for later use in transferring the message from one of the selected files 2 to core memory 1. Additionally, the setting of the latch 48 is employed to indicate the completion of the code interrogation operation. The output of the latch 48 is applied to a control counter 49 by a line 50 setting the counter to its binary zero position.

The counter 49 is a standard counter circuit and may comprise four stages giving the counter a maximum binary count of sixteen positions which are normally labeled position zero through position fifteen. The output signals from each stage in the counter are applied to a decode circuit 51 which generates a single enabling signal corresponding to each position of the counter. The counter 49 advances simultaneously with the interrogation operation to be described hereinafter. The zero position of the control counter 49 is decoded in the decode circuit 51 and applied to an address latch 52 by a line 53. The output of the address latch 52 is applied to a plurality of OR gates 54, 55 and 56.

The output signal of the OR gate 56 is applied to the A STAR 40 by a line 57, an AND gate 58 and an OR gate 59, and is employed to transfer the control of the core memory 1 interrogation operation from the I STAR 26 to the A STAR 40. The AND gate 58 has a second enabling signal applied thereto from a compare latch 78 described hereinafter. The A STAR 40 contains the core memory address of the first character in the DCF format 7. This character is read from core storage 1 through the A and B registers 25 and 23 respectively and an I/O register 60 into a file select circuit 61. The file select circuit 61 is completely described by Foulger et al. in their copending application entitled File Selection System, assigned to the assignee of the present invention, Ser. No. 383,541. The select circuit 61 indicates which one of the files 2 is to receive a message from or supply a message to the core memory 1.

The output of the OR gate 54 is applied to an AND gate 62 by a line 63 and is employed to reinsert the first character of the DCF format 7 into the same character location in core memory just interrogated. During subsequent operations, the output of the OR gate 54 is also employed to perform similar reinsertion operations. The output of the OR gate 55 is applied to the address modify circuit 38 by a line 64 indicating that the address in the A STAR 40 is to be increased by one. Additionally, the output of the OR gate 55 is applied to the control counter 49 by the line 64 and a line 65 indicating that the control counter 49 is to advance one position. Areas 8 and 9 of the DCF format 7 shown in FIG. 2 are successively interrogated from core memory 1 and are transferred to the file selected circuit 61 for selecting a desired module 2 as described in the previously identified patent application.

Referring to line A of FIG. 4, the entire address transfer operation is schematically shown. The identifying numerals 0–9 shown throughout FIG. 4 correspond to the binary number generated by the control counter 49. Each time a new character position of core memory is interrogated, the control counter advances one position and applies its output signals to the decode circuit 51. The output signals from the decode circuit 51 correspond to successive characters in the DCF format 7 shown in FIG. 2 and are employed to indicate which character of the DCF format 7 is presently being interrogated from core memory. The numerals **1*a* through 100*a* represent the message characters in the area 13 of the DCF format 7** involved in the data transfer operation and are generated in a counter described hereinafter.

Referring again to FIG. 3*a*, when the control counter 49 reaches its binary six position, the decode circuit 51 applies an output signal to an AND gate 66 by a line 67. The AND gate 66 has a second enabling signal applied thereto from the address latch 52. The output of the AND gate 66 is applied to a recycle latch 68 by an OR gate 69. The output of the OR gate 69 also resets the address latch 52 to its second stable condition wherein it ceases to generate its enabling output signal. The recycle latch 68 is set to its first stable condition wherein it applies its enabling output signal to the OR gates 54 and 56, and to an additional pair of OR gates 70 and 71. The output signal from the OR gate 54 continues to reinsert each interrogated character into the same core memory location and the output signal from the OR gate 56 continues the interrogation of the core memory 1 under the control of the A STAR 40. The output from the OR gate 70 is applied to the address modify circuit 38 by the line 73 indicating that the core memory address just interrogated is modified by a minus one causing a recycling of the core memory circuit 1 back through the address area 9 of the DCF format 7. The output of the OR gate 70 is also applied to the counter 49 by the line 73 and a line 74 decreasing the counter 49 one position for each character interrogated. The output of the OR gate 71 is applied to an AND gate 75 as an enabling signal, the significance of which is described hereinafter.

Referring again to FIG. 4, line B of the operation of the interrogation circuits of the core memory 1 is reversed and the interrogation operation recycles back to character position one of the address portion 9 of the DCF format 7. At this time, the control counter 49 again is in the binary decode one position and its decode circuit 51 applies its output signal to an AND gate 75 by a line 76, which gate has been previously enabled by the output signal of the OR gate 71. The output signal of the AND gate 75 sets a compare latch 78 to its first stable state wherein it applies its "ON" enabling output signal to the OR gates 54, 55 and 56. Additionally, the output of the AND gate 75 resets the recycle latch to its second stable condition.

The setting of the compare gate latch 78 indicates that the address portion 9 of the DCF format 7 is to be reinterrogated from the core memory 1. Additionally, the output from the compare latch 78 is applied to a read transducer 80 of the selected file 2 by a line 82. The read transducer transfers the section address information from the file 2 to the A register 25 by means of the I/O register 60. The output from the OR gate 56 is applied to the A STAR 40 by the line 57, an AND gate 86 and the OR gate 59 causing the A STAR 40 to interrogate the first character in the address portion 9 of the DCF format 7. The AND gate 86 has a second input signal applied thereto from the read transducer 80 by a line 87. This second input signal comprises a sector pulse read from the file 2 by any one of a plurality of well-known methods. Each section on the file 2 is prefaced with a sector pulse and each pulse indicates that the section address follows immediately. The sector pulse is employed in the instant invention to synchronize the interrogation of the address portion 9 in the DCF format 7 from core memory 1 and the reading of the section address from the file 2 by the read transducer 80.

The first address character of the address portion 9 is transferred into the B register 23. Simultaneously, the first character of the section address is read from the file 2 by the read transducer 80 and is placed into the A register 25 through the I/O register 60. The output of the A register 25 and the B register 23 is applied to a compare circuit 88. The compare circuit is of standard construction and generates a plurality of status signals indicating when the compared characters are equal, when the character in the B register 23 is greater than or less than the character in the A register on its output lines 89, 90 and 91 respectively. The output of the compare circuit on lines 90 and 91 are applied to an address compare latch 92 by an OR gate 93 setting it to its second stable state wherein it generates a not equal output signal. Originally, the address compare latch 92 is set to its first stable state wherein it generates an output signal indicating that an equal condition exists. The address compare latch 92 is set to its first stable condition by the output of the latch 35 by a line 94 and an OR gate 95. If the results of the first character comparison indicate a match, the condition of the compare latch remains unchanged. However, if the output of a compare circuit indicates a mismatch, the compare latch is driven to its second stable state wherein it generates an output signal indicating that the address being interrogated from core memory 1 is not the same address being read from file 2. The not equal output signal from the compare latch is applied to an AND gate 96 by a line 97. Successive characters in the address portion 9 of the DCF format 7 are compared with successive characters read from the address portion of the file 2.

The result of each successive compare operation is applied to the compare latch 92. At the end of an address compare operation the recycle latch 68 is turned on by the AND gate 96 and the OR gate 69. The output of the OR gate 69 resets the compare latch 78 by an OR gate 98 resetting the latch to its second stable state wherein it generates an "OFF" or second enabling output signal for application to the AND gate 58 by a line 99. The AND gate 96 has three input signals; the first of which is the not equal output signal of the address compare latch 92, the second of which is the decode six signal on line 67 and 100 from the decode circuit 51, and the third of which is the "ON" enabling output signal from the compare gate latch 78. This recycle operation is the same as the previous recycle operation and comprises utilizing the address stored in the A STAR 40 to interrogate a character from a memory location under the control of the OR gate 56, reinserting this character back into the same memory location under the control of the OR gate 54, and decreasing the contents of the control counter 49 and the address modifier circuit 38 by one under the control of the OR gate 70. Referring to lines C and D of FIG. 4, it can be seen that the recycle operation also follows a compare unequal operation and reverses the interrogation process back to the first character of the address area 9 in the DCF format 7.

When the control counter 49 is decreased to its binary one position, the decode circuit 51 applies its decode one signal to the AND gate 75 by the line 76. The AND gate 75 has a second enabling input signal applied thereto from the recycle latch 68 and the OR gate 71. The compare latch 78 is again turned "ON" and a second compare operation is undertaken. The first character stored in the core storage 1 is again transferred to the B register 23 and the first character of the section address read from the next successive message on the file 2 is transferred to the A register 25. The outputs of the A register 25 and the B register 23 are compared in the compare circuit 88 and the resultant signal is applied to the address compare latch 92. Successive interrogation cycles and reading cycles compare all characters in the address portion 9 of the DCF format 7 and the section address on the file 2. When the address compare latch 92 generates an equal compare signal, it applies the compart equal signal to a pair of AND gates 101 and 102 by a line 103 and to a write transducer 104 by a line 107.

Referring to line E of FIG. 4, it can be seen that the control counter 49 and the A STAR advance to character position nine of the DCF format 7. The decode circuit 51 generates an enabling output signal on its decode nine output line 108, and applies it to the AND gates 101 and 102. The AND gate 102 has an additional enabling input signal applied thereto from the compare latch 78 by a line 109. The output of the AND gate 102 resets the compare latch 78 by the OR gate 98 and sets a substitute latch 114 to its first stable state, wherein it generates an enabling output signal for application to the address modify circuit 38 by a line 115, the A STAR 40 by the line 115 and a line 116, the OR gate 54 by the line 115 and a line 117, and an AND gate 118 by the line 115 and a line 119. This enabling signal causes the A STAR 40 to interrogate the memory location corresponding to character position nine of the DCF format 7, to modify this address plus one and to insert the modified address into the B STAR 39 by the AND gate 118. The interrogated character is transferred to the B register 23 and reinserted into the same memory location by the AND gate 62.

The last interrogation operation has advanced the address held in the B STAR 39 to the tenth character location of the DCF format 7 while keeping the address of the A STAR 40 to the ninth character location. The significance of this operation is that the tenth character position is the first message character position. Therefore, when the B STAR 39 controls the addressing of the core memory, as described hereinafter, the message is transferred to the compare circuit 88 starting with the first message character. At the completion of this operation, the substitute latch 114 is reset by a signal from the AND gate 118 setting the latch to its second stable state wherein it applies its "OFF" second enabling output signal to the AND gate 101. The AND gate 101 has three additional input signals; the first of which is the "OFF" enabling output signal generated by the compare latch 78 in its second stable state by a line 120, the second of which is the binary decode nine signal on the line 108 from the decode circuit 51, and the third of which is applied thereto from the address compare latch 92 by the line 103. The output of the AND gate 101 is applied to an add latch 121 by means of an OR gate 122, setting the add latch 121 to its first stable condition whereby it generates an enabling signal for application to the OR gates 56, 70 and 71 and a plurality of AND gates 124, 126 and 128 by lines 130, 132 and 134 respectively. The AND gate 126 has an additional enabling signal applied thereto from decode positions nine, eight or seven from the decode circuit 51 by a line not shown. The output of the AND gate 126 is connected to a nine inject circuit 140 by a line 142. The inject circuit 140 is connected to the A register 25 and is employed to inject a binary nine character into the A register 25 simultaneously with the reverse interrogation of each section character 12 in the area 11 of the DCF format 7. The outputs from the B register 23 and the A register 25 are applied to an adder circuit 144 wherein the contents of the B register is added to the contents of the A register. The output of the adder 144 is applied to a section decode circuit 146 and reinserted into the core memory 1 by the AND gate 124. The OR gate 70 furnishes an enabling signal to the address modify circuit 38, causing that circuit to decrease the address stored in the A STAR 40 by one, and furnishes the same enabling signal to the control counter 49 to decrease its count by one.

Referring to line F of FIG. 4, it can be seen that this reverse interrogation is repeated through the decode seven position. During this reverse interrogation of area 11 of the DCF format 7 and the adding of a numeral nine to the characters in this area, the number represented by all the section characters in the area 11 is reduced by one. The section decode circuit 146 tests the result of each adding operation to determine when the result of each adding operation is "zero." A "zero" output signal indicates that the succeeding data transfer operation is the last group of characters to be transferred in the present multiple section search operation.

The output signal from the latch 35, 36 or 37 is applied to a multiple section latch 148 by the OR gate 95, an OR gate 150 and the line 94 or line 152 or 154 respectively corresponding to the operation code specified in portion 3 of the operation code 4 shown in FIG. 1. Referring again to FIG. 3*c*, the latch is set to its first stable state wherein it applies its "ON" enabling output signal to an AND gate 156. The "zero" output signal from the section decode circuit 146 is applied to the OR gate 150 by a line 158, and the "not zero" output signal from the section decode circuit 146 is applied to the latch 148 by a line 160 setting the latch 148 to its second stable state wherein it generates an "OFF" enabling output signal for application to an AND gate 162.

While the final character in the section portion 11 of the DCF format 7 is being added to the numeral nine in the adder 144, the decode position seven of the decode circuit 51 is applied as a reset pulse to the add latch 121 by a line 164 and an OR gate 166 driving the add latch 121 to its second stable state wherein it removes its enabling output signal from the OR gates 56, 70 and 71. During the last interrogation operation, the address held in A STAR 40 is reduced one additional character position to the last character position of the address portion 9 in the DCF format 7. Additionally, the control counter was decreased to its decode six position. Immediately upon the resetting of the add latch 121, the OR gate 56 loses its only enabling signal. Therefore the low output of the OR gate 56 is inverted in an inverter 168 and the inverted signal is applied to the OR gates 54 and 55 and to the B STAR 56 by the lines 170, 171 and 172, respectively. This enabling signal from the B STAR 39 causes the interrogation of the address position held in B STAR 39.

Referring to line G of FIG. 4, the address held in B STAR 39 corresponds to the first character of the message area 13 in the DCF format 7. This first character is transferred from core memory 1 to the B register 23. Simultaneously, the first character of the message on the file is read and transferred to the A register 25. The contents of the A and B registers 25 and 23 are compared in the compare circuit 88 which generates a plurality of output signals on its lines 89, 90 and 91. The utilization of these signals is completely described with reference to FIG. 5. The contents of the B register is reinserted into the core memory 1 by the AND gate 62. Each character transferred from the file 2 is counted by a character counter 174. The character counter 174 is a standard counter operating to count successive characters in groups of one hundred. After each one-hundred group of characters, it generates an output signal for application to the AND gates 156 and 162. The B STAR 39 continues its interrogation operation of successive memory locations until a group of hundred message characters has been transferred from the file 2.

The output from the AND gate 162 is applied to the OR gate 122 setting the add latch 121 to its first stable state wherein it generates an enabling output signal for application to the OR gates 56, 70 and 71. The output of the OR gate 56 changes the control of the computer interrogation from the B STAR 39 to the A STAR. Additionally, the output of the OR circuit 70 causes the address modify circuit 38 to reduce the address location held in A STAR 40 by one for each address interrogation operation. The output of the add latch 121 is also applied to the AND gate 128. The AND gate 128 has a second enabling input signal from decode positions one through six of the decode circuit 51. The output of the AND gate 128 is applied to a zero inject circuit 178 by a line 180. The inject circuit 178 operates to inject the numeral zero into the A register 25 during the present decreasing of the control counter 49 through decode positions six through one. Simultaneously with the injecting of the first zero into the A register 25, the A STAR 40 interrogates core memory and transfers the last character of the address area 9 into the B register 23. The output of the A register 25 and B register 23 are applied to the adder circuit 144. The adder utilizes the carry digit from the preceding subtract operation to increase the last character of the address area 9 by one. The result of the addition is reinserted to the same address memory location just interrogated by the AND gate 124. The A STAR 40 recycles back through the address area 9, adding zero to each character in the address area 9 of the DCF format 7. Therefore, by adding the numeral zero to each character in the address area 9 and by using the carry digit from the preceding addition operation, if any, the characters in the address area 9 are increased by one.

In this manner the address held in core storage is increased by one so that during the next address compare cycle, employing the address of the next successive section of the file 2, an address compare equal signal will be generated by the compare latch 92.

Referring to line H of FIG. 4, the entire address held in core storage has been interrogated and increased by one. Upon reaching the decode position one, the decode circuit 51 applies its enabling output signal to the AND gate 75 and a second address compare cycle is initiated. Additionally, the output of the AND gate 75 resets the add latch 121 by the OR gate 166 and a line 182.

Referring to line I of FIG. 4, this standard address compare cycle includes the interrogation of characters one through nine of the DCF format 7. Upon reaching the character nine, the standard substitute operation and section subtract operation is initiated by the substitute latch 114 and the add latch 121 respectively. Upon the completion of the subtract operation, the add latch 121 is reset by the decode seven signal from the decode circuit 51 over the line 164.

Referring to line K of FIG. 4, the control of the computer interrogation operation is again under the control of the B STAR 39 and the message held in area 13 of the DCF format 7 is again interrogated and is compared one character at a time with the message read from the next section of the file. As previously mentioned, this transferral of the control of the memory interrogation operation to the B STAR 39 is initiated by the output of the inverter 168. Additional address add operations, compare equal operations, substitute and section subtract operations are continued until at the end of the final subtract operation, the sector decode circuit 146 generates an output signal on the line 158 indicating that the sector area 11 of the DCF format 7 has been reduced to zero. This signal on the line 158 sets the latch 148 to its second stable state wherein it generates an enabling output signal for application to an AND gate 156. The AND gate 156 has a second input signal from the character counter 174. The output of the AND gate 156 is applied to the I STAR 26 by a line 184 indicating that at the termination of the present one-hundred character search operation, identified by the output of the counter 174, the computer is to advance to the next operation code 4. The sector decode circuit 146 is only employed to end the multiple section search operation in those instances when the identification word or number is not found. The circuitry shown in FIG. 5 ends the search operation when the identification word or number is found.

FIG. 5 shows a block diagram of the status determining circuitry employed in the instant invention. Additionally, FIG. 5 includes some of the circuits shown in FIG. 3 in order to explain clearly the co-operation between the processor of the status determining circuitry. The operation decode circuit 27 and its associated latches 35, 36 and 37 determine which one of three possible scanning operations is to be performed. The output of the latch 35 indicates that a search high operation is to be performed. That is, the processor requires the address of the first file section containing an identification number greater than the corresponding number contained in the message area 13 of the DCF format 7. The output of this latch is applied to an AND gate 190 and an OR gate 192. The OR gate 192 has two additional input signals; one of which is from the the latch 36 indicating that a search low operation is to be performed, and the other of which is from the latch 37 indicating that a search equal operation is to be performed. The search low operation indicates that the processor requires the address of the first file section containing an identification number less than the corresponding number contained in the message area 13 of the DCF format 7. The search equal operation indicates that the processor requires the address of the file section containing an identification word or number which is equal to the corresponding word or number contained in the message area 13 of the DCF format 7. Obviously, a search equal operation is the only operation that is used when searching for an identification word.

The output of the OR gate 192 is applied to an AND gate 194 and to a plurality of decode circuits 196, 198 and 200. The decode circuit 196 is associated with the search high operation and is furnished four additional input signals; one of which is from the compare circuit 88 by the line 90, the second of which is from a skip decode circuit 202 by an inverter 204 and a line 205, the third of which is from a search end decode circuit 206 by a search end latch 207, an inverter 208 and a line 209, the fourth of which is from an inverter 210. The search low decode circuit 198 is associated with a search low operation and is furnished four additional input signals; one of which is from the compare circuit 88 by the line 91, the second of which is from the inverter 204 by the line 205 and a line 211, the third of which is from the inverter 208 by the line 209 and a line 212, and the fourth of which is from an inverter 213. The search equal decode circuit 200 is associated with a search equal operation and is furnished three additional input signals; one of which is from the compare circuit 88 by the line 89, the second of which is from the inverter 204 by the lines 205 and 211 and a line 214, and the third of which is from the inverter 208 by the lines 209 and 212, and a line 215. Although each of the decode circuits 196, 198 and 200 are associated with a particular search operation, all are responsive to signals received during a multiple section search operation.

The output of the search high decode circuit 196 is applied to a search high latch 216, which latch has a second input reset signal from the file 2 by a line 217. The output of the search high latch 216 is applied as the second enabling signal to the AND gate 190 and is applied to an OR gate 218 and the inverter 213. The output of the search low decode circuit 198 is applied to a scan search low latch 219 setting the latch to its first stable state wherein it applies its enabling output signal to the OR gate 218, to the inverter 210, and to an AND gate 220.

The output of the search equal decode circuit 200 is applied to a search equal latch 221 setting this latch to its first stable state wherein it generates an enabling output signal for application to the AND gate 194. The output of the OR gate 218 is applied as a second input signal to the search equal latch 221 resetting the latch to its second stable state wherein it ceases to generate an enabling output signal. The search low latch 219 has a second reset input signal furnished from the file 12 by the line 217 and a line 222. The scan equal latch 221 has a second reset input signal applied thereto from the file 2 by the line 217 and a line 224.

The output of the AND gate 190 is applied to an OR gate 226 and to an AND gate 228. The output of the AND gate 220 is applied to the OR gate 226 and to an AND gate 230. The output of the AND gate 194 is applied to the OR gate 226 and to an AND gate 232. The output of the OR gate 226 is applied to a sector control latch 234 setting the latch to the first stable state wherein it generates an enabling output signal for application to an AND gate 236. The AND gate 236 has a second enabling signal applied thereto from a file 2 by the line 217 and a line 238. The AND gates 228, 230 and 232 have the same input signal applied to each from the file 2 by the line 234 and a plurality of lines 240, 242 and 244 respectively.

The first status signal from the compare circuit 88 is applied to a process equal latch 250 by the line 89, a line 252 and an OR gate 254. The second status signal from the compare circuit 88 is applied to a processor low latch 256 by the line 91, a line 258 and an OR gate 260. The third status signal from the compare circuit 88 is applied to a processor high latch 262 by the line 90, a line 264 and an OR gate 266. The OR gate 254 has a second enabling input signal from an AND gate 268. The AND gate 268 has two enabling signals applied thereto; one of which is from the AND gate 232, and the other of which is from the AND gate 236. The OR gate 260 has a second enabling signal applied thereto from an AND gate 270. The AND gate 270 has two enabling input signals applied thereto; one of which is from the AND gate 230, and the other of which is from the AND gate 236. The OR gate 266 has a second enabling signal applied thereto from the AND gate 272. The AND gate 272 has two enabling input signals applied thereto; one of which is from the AND gate 228 and the other of which is from the AND gate 236. The output of the AND gate 236 is also applied as a reset signal to the latches 35, 36 and 37 and is applied to the I STAR 26 as a signal to advance to the next succeeding computer operation code upon the finding of the desired identification word or number. The next operation code operates to test the condition of the processor latches 250, 256 and 266 providing the processor with the result of the multiple section scanning operation.

Referring to FIG. 2, the message area 13 of the DCF format 7 contains a plurality of skip characters 276 and a special search end character 277. The skip character 276 and the search end character 277 are placed anywhere in the message area 13 of the DCF format 7. The skip characters indicate that this character location is not part of the identification word or number. The decoding of a search end character indicates that the search operation for this section is completed. Each of these characters is applied to the decode circuits 202 and 206. The outputs of these two decode circuts are applied to the search decode circuits 196, 198 and 200 indicating that the search operation is only to be performed when these characters are not present.

In operation, the indicia in portion 3 of the operation code 4, shown in FIG. 1 is decoded in the operation decode circuit 27. The decode circuit 27 applies an enabling signal to one of the latches 35, 36 or 37. For purposes of the description, it is assumed that the search equal signal is decoded from the indicia held in portion 3 of the operation code 4.

As previously mentioned the output of the latch 48 shown in FIG. 3 is applied to the file 2 indicating that a read operation is to be performed. This signal enables the read transducer 80 associated with the selected file 2 and causes the transducer to read the data contained on the designated section. The data from the file 2 is applied to the A register 25 by a line 274 shown in FIG. 5. Simultaneously, the interrogation circuit associated with the core memory 1 reads out successive characters from the core memory and applies these characters to the B resigter 23 as previously described. The contents of the B register and the A register are compared character by character in the compare circuit 88. The compare circuit 88 generates its three additional status output signals for application to the processor latches 250, 256 and 262 and the decode circuits 196, 198 and 200. The output of the B register 23 is applied to both the skip character decode circuit 202 and the search end decode circuit 206. Whenever a low status signal is first generated in the compare circuit 88 and applied to the decode circuit 198 by the line 91, the search low latch 219 is set. Thereafter additional status signals, whether high or equal will not set their respective latches 216 and 221 because of the disabling operations of the inverter 216 and the OR gate 218 respectively. The inverter 210 prevents status signals passing through the decode circuit 196, and the output of the OR gate 218 keeps the search equal latch 221 reset to its second stable state. Similarly, when a high status signal is first generated in the compare circuit 88 and the search high latch 216 is set to its first stable condition, successive low or equal status signals will not set their respective latches because of the inhibiting operation of the inverter 213 and the OR gate 218. The inverter 213 prevents low status signals from passing through the decode circuit 198 and the OR gate 218 holds the search equal latch 221 in its reset condition. It can be seen that a plurality of equal status signals generated first by the compare circuit 88 sets the search equal latch 221 to its first enabling condition and thereafter a single high or low status signal will reset the scan equal latch and prevent any change thereafter in the latches 216, 219 and 221.

During a search low or high operation, a status signal generated in the compare circuit 88 which is not the status signal being sought, sets its associated latch. Thereafter, additional status signals corresponding to the status signal being sought do not set their corresponding latch. It should be noted that during a search low or a search high operation, an equal status signal does not generate a disabling signal as does either of the other two status signals. However, this is a matter of choice and additional inverters could be employed to perform this disabling process.

The instant invention locates the section at which the searching operation is to begin by the circuitry shown in FIG. 3. This same circuitry directs the searching of any additional sections until the section decode circuit 146 indicates that all sections involved have been searched or the searching operation is ended by the output signal of the AND gate 236 shown in FIG. 5. The output signal from the AND gate 236 is generated upon the coincidence of an operation decode signal furnished by the latches 35, 36 or 37 to one of the AND gates 190, 220 or 194 respectively the setting of a corresponding latch 216, 219 and 221 respectively, and the furnishing by the activated latch of a signal to the same AND gates 190, 220 or 194 with a second enabling signal. The AND gates 190, 220 or 194 apply its output signal to the sector control latch 234 through the OR gate 226 setting the latch to its first stable state wherein it applies an enabling output signal to the AND gate 236. Then upon the application of the end of sector pulse to the AND gate 236 by the line 238, the AND gate 236 applies its output signal to the I STAR 26. The I STAR moves to the next operation code which directs the processor to test its latches 250, 256 and 262. The processor can then utilize the information contained in its latches and the address field 9 of the DCF format 7.

It is intended that identification indicia used in the claims includes both the identification word and number described in the specification.

While the invention has been particularly shown and described with reference to a preferred embodiment thereof, it will be understood by those skilled in the art that various changes in form and details may be made therein without departing from the spirit and scope of the invention.

What is claimed is:

1. In a file searching system for searching a plurality of individually addressable file sections to determine the high, low or equal status of an identification indicia relative to one of a plurality of message indicia stored in said sections, a multiple section search circuit comprising, means for storing a disk control field and said field comprises a plurality of characters constituting an identification indicia and section address indicia for identifying that file section at which the searching is to begin and section count indicia for indicating the total number of file sections to be searched, means for utilizing said stored section address to designate the file section at which searching is to begin, means for comparing said identification indicia with the message indicia in the designated section, and means for employing the results of said comparison to determine the status of the identification indicia.

2. In a file searching system for searching a plurality of individually addressable file sections to determine the high, low, or equal status of an identificaton indicia relative to one of a plurality of message indicia stored in said sections, a multiple section search circuit comprising, means for storing a disk control field and said field comprises a plurality of characters constituting an identification indicia and section address indicia for identifying that file section at which the searching is to begin and section count indicia for indicating the total number of file sections that are to be searched, means for utilizing the stored section address to designate said file section at which searching is to begin, means for reading the message indicia from said designated file section, means for comparing said identification indicia with the message indicia read from said designated file section, means for employing the results of said comparison to determine the status of said identification indicia, means for modifying said stored section address to designate the next file section which is to be searched and means for modifying said stored section count as each successive one of said addressed sections is searched.

3. In a file searching system for searching a plurality of individually addressable file sections holding a plurality of message indicia for an identification indicia, a multiple section search system comprising, means for storing a status indicia indicating the type of searching operation to be performed, and a disk control field, said disk control field comprising a plurality of characters constituting an identification indicia and section address indicia for identifying that file section at which the searching is to begin and section count indicia for indicating the total number of file sections to be searched, means for utilizing said stored section address to designate the file section at which searching is to begin, means for reading the message indicia from said designated file section, means for comparing said identification indicia with the message indicia read from said designated file section, means for generating a high, low, or equal status signal as the result of each comparison, means for unchangeably setting a status latch when the generated status signal differs from said stored status indicia, means for changeably setting a status latch when said generated status signal equals said stored status indicia, means for resetting said changeable status latch upon the generation of a said subsequent status signal which differs from said stored status indicia, means for modifying said stored section address to designate the next file section which is to be searched, means for modifying said stored section count as each successive one of said addressed sections is searched, and means for transferring control to said reading means until a plurality of status signals are generated which equal the stored status indicia.

4. In a file searching system for searching a plurality of individually addressable file sections as recited in claim 3 and further including, means for ending the searching operation prior to searching the file sections corresponding to said section count upon the location of the stored characters constituting said identification indicia.

5. In a file searching system for searching a plurality of individually addressable file sections to determine the high, low, or equal status of an identification indicia relative to one of a plurality of message indicia stored in said sections, a multiple section search system comprising, means for storing a status indicia indicating the type of searching operation to be performed, and a disk control field, said disk control field comprising a plurality of characters constituting an identification indicia and section address indicia for identifying that file section at which the searching is to begin, and section count indicia for indicating the total numbei of file sections to be searched, means for utilizing said stored section address to designate the file section at which the searching is to begin, means for reading the message indicia from said designated file section, means for comparing said identification indicia with the message indicia read from the designated file section, means for employing the results of said comparison to determine the status of said identification indicia, means for modifying said stored section address to designate the next file section which is to be searched, means for modifying said stored section count as each successive one of said addressed sections is searched, means for transferring control to said reading means until the status of the message indicia read from the designated sections are determined to equal the stored status indicia, and means for generating an end of search signal upon the determination that the status of a message indicia read from the designated file section equals said stored status indicia.

6. In a file searching system for searching a plurality of individually addressable file sections as recited in claim 5 which further includes, a computer, means for furnishing said status of the message indicia read from said designated file section to said associated computer, and means for enabling said computer to test the results of said comparison operation.

7. In a data processing system employing a computer which is responsive to predetermined operation codes for transferring data between the computer and a plurality of individually addressable storage sections in a file module, and each of the sections being employed for storing a plurality of message indicia, a multiple section search circuit comprising, a storage circuit, an operation code stored in said storage circuit, a control field having a plurality of characters and locatably identified by said operation code and stored in said storage circuit and including, at least one address character for designating the file module section at which searching is to begin, at least one numeric section character for indicating the number of sections to be searched, and a plurality of data characters for identifying a desired message, means for decoding said section character to indicate the presence and absence of a predetermined section character indicating that searching is to be terminated, means responsive to said operation code for reading and locating said message indicia in a first file module section identified by said address character, counting means responsive to said reading means for maintaining count of said data characters and for indicating when an entire section has been read, means responsive to said operation code for interrogating said identification indicia from said control field in synchronism with the reading of the message indicia in said identified storage section, means responsive to said reading means and said interrogating means for comparing said identification indicia with said message indicia, means responsive to said comparing means for generating a plurality of status signals, and means responsive to certain of said status signals and to said section character decoding means and to said counting means for cycling back to said address character and for altering said address character to equal the next address expected to be read from next said file section.

8. A multiple section search circuit as recited in claim 7 wherein each of said sections is being employed for storing a uniform number of data characters.

9. In a data processing system employing a computer which is responsive to predetermined operation codes for transferring data between the computer and a plurality of individually addressable storage sections in a file module, and each of the sections being employed for storing a plurality of message indicia in addition to respective address indicia prefacing each plurality of message indicia in a respective section, a multiple section search circuit comprising, a storage section, an operation code stored in said storage circuit, a control field having a plurality of addressable character positions and being locatably identified by said operation code and stored in said storage circuit and comprising, a plurality of address characters for designating the file module section at which searching is to begin, a plurality of numeric indicating section characters for indicating the number of sections to be searched and, a plurality of data characters for identifying a desired message, decoding means responsive to said section characters for indicating the presence and absence of a predetermined numeric indicating value at which searching is to be terminated, means responsive to said operation code for reading and locating said message indicia in a first said module section identified by said addressing characters, means for interrogating said control field in said storage circuit, first counting means for maintaining count of said address characters and said section characters and for identifying each said address character and said section character as it is being interrogated, second counting means responsive to said reading means for maintaining count of said data characters and for indicating when an entire section has been read, means responsive to said operation code for interrogating said identification indicia from said control field in synchronism with the reading of the message indicia in said identified storage section, means responsive to said reading means and said interrogating means for comparing said identification indicia with said message indicia, means responsive to said comparing means for generating a plurality of status signals, means responsive to said certain of said status signals and to said decoding means and to said second counting means for recycling said interrogation of said section characters and for reducing said numeric indicating section characters by the number of sections searched, and means responsive to certain of said status signals and said decoding means and to said second counting means for recycling the interrogation of said address characters and for increasing said address character to a representation of the next address expected to be read from the file.

References Cited

UNITED STATES PATENTS

| | | | |
|---|---|---|---|
| 2,960,683 | 11/1960 | Gregory | 340—172.5 |
| 2,968,027 | 1/1961 | McDonnell et al. | 340—172.5 |
| 3,017,610 | 1/1962 | Auerback | 340—146.2 |
| 3,141,151 | 7/1964 | Gilson | 340—172.5 |
| 3,168,724 | 2/1965 | Anderson | 340—172.5 |
| 3,197,742 | 7/1965 | Rettig et al. | 340—172.5 |
| 3,289,175 | 11/1966 | Rice | 340—172.5 |

ROBERT C. BAILEY, *Primary Examiner.*

PAUL J. HENON, *Examiner.*

I. FAIBISCH, *Assistant Examiner.*